US009377886B2

(12) United States Patent
Jhu et al.

(10) Patent No.: US 9,377,886 B2
(45) Date of Patent: Jun. 28, 2016

(54) OPTICAL TOUCH DISPLAY APPARATUS (75) Inventors: Yu-Lun Jhu, Hsin-Chu (TW);
Chen-Lung Chen, Hsin-Chu (TW);
Chwen-Tay Hwang, Hsin-Chu (TW);
Hai-Yuan Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 1214 days.

(21) Appl. No.: 12/881,177

(22) Filed: Sep. 14, 2010

(65) Prior Publication Data
US 2011/0148816 A1    Jun. 23, 2011

(30) Foreign Application Priority Data

Dec. 17, 2009   (TW) .............................. 98143388 A (51) Int. Cl.
*G06F 3/041* (2006.01)
*G06F 3/042* (2006.01)

(52) U.S. Cl.
CPC ............ *G06F 3/0412* (2013.01); *G06F 3/0428* (2013.01)

(58) Field of Classification Search
USPC ................................................ 345/175–178
See application file for complete search history.

(56) References Cited

U.S. PATENT DOCUMENTS

| 6,690,363 | B2 | 2/2004 | Newton |
| 6,836,367 | B2 | 12/2004 | Seino et al. |
| 7,515,143 | B2 | 4/2009 | Keam et al. |
| 2006/0192755 | A1 | 8/2006 | Blythe et al. |
| 2008/0122803 | A1 | 5/2008 | Izadi et al. |
| 2009/0027358 | A1* | 1/2009 | Hosono ......................... 345/175 |
| 2009/0135625 | A1* | 5/2009 | Yang et al. ..................... 362/613 |
| 2009/0167656 | A1* | 7/2009 | Ahn et al. ........................ 345/87 |
| 2009/0190059 | A1* | 7/2009 | Ra .................................... 349/58 |
| 2009/0295744 | A1* | 12/2009 | Onishi ........................... 345/173 |
| 2010/0020334 | A1* | 1/2010 | Nakanishi ..................... 356/614 |
| 2010/0085330 | A1* | 4/2010 | Newton ......................... 345/175 |
| 2010/0128003 | A1* | 5/2010 | Orsley ........................... 345/175 |

(Continued)

FOREIGN PATENT DOCUMENTS

| CN | 101666932 | 3/2010 |
| TW | M326640 | 2/2008 |
| TW | M341939 | 10/2008 |

(Continued)

OTHER PUBLICATIONS

"Office Action of Taiwan Counterpart Application", issued on Jan. 17, 2013, with English translation focused on the reasons of rejection by the examiner thereof, p. 1-p. 33.

(Continued)

*Primary Examiner* — Gerald Johnson
*Assistant Examiner* — Maheen Javed
(74) *Attorney, Agent, or Firm* — Jianq Chyun IP Office (57) ABSTRACT

An optical touch display apparatus including a backlight module, a display panel, and at least an optical detector is provided. The backlight module is capable of providing a visible beam and an invisible beam. The display panel is disposed at one side of the backlight module. A sensing space is located in front of the display panel, and the display panel is located between the backlight module and the sensing space. The visible beam and the invisible beam are capable of passing through the display panel and then being transmitted to the sensing space. The optical detector is disposed outside the display panel for sensing the invisible beam from the sensing space.

22 Claims, 10 Drawing Sheets

(56) References Cited

U.S. PATENT DOCUMENTS

| | | | |
|---|---|---|---|
| 2010/0246212 A1* | 9/2010 | Yang et al. | 362/607 |
| 2011/0115747 A1 | 5/2011 | Powell et al. | |

FOREIGN PATENT DOCUMENTS

| | | |
|---|---|---|
| TW | 200925964 | 6/2009 |
| TW | M358322 | 6/2009 |
| TW | M358363 | 6/2009 |
| TW | 200930942 | 7/2009 |
| TW | 200935143 | 8/2009 |
| TW | M368847 | 11/2009 |
| WO | 2009081810 | 7/2009 |
| WO | 2009093388 | 7/2009 |
| WO | 2009104667 | 8/2009 |
| WO | 2009110293 | 9/2009 |
| WO | 2009110294 | 9/2009 |

OTHER PUBLICATIONS

"First Office Action of China Counterpart Application" with English translation thereof, issued on Apr. 1, 2012, p. 1-p. 8.

* cited by examiner

OPTICAL TOUCH DISPLAY APPARATUS

CROSS-REFERENCE TO RELATED APPLICATION

This application claims the priority benefit of Taiwan application serial no. 98143388, filed on Dec. 17, 2009. The entirety of the above-mentioned patent application is hereby incorporated by reference herein and made a part of this specification.

BACKGROUND OF INVENTION

1. Field of Invention

The invention relates to a touch display apparatus. More particularly, the invention relates to an optical touch display apparatus.

2. Description of Related Art

With advancement of electro-optical science and technology, a consumer is no longer content to use his or her computer and control the screen by operating a mouse. A more ergonomic concept allowing users to control by simply using their fingers gradually becomes available. Finger-touch operation is an integral part of our daily lives. It is especially convenient for children and seniors who tend to have trouble using the mouse. As an evident proof, many banks have applied touch screens on their automatic teller machines (ATMs).

Most of the conventional notebook computers are fitted with a touchpad or a track point located beside the keys on a keyboard for operating the computers, given that no external mouse is connected. However, many users may find that the touchpad and the track point are not as ergonomic as the external mouse. With the touch-screen function, users may enjoy more convenience. The touch-screen operation is a rather instinctual control method allowing users to have direct contact with screens. When touch panels are equipped in notebook computers, users may operate without much trouble and enjoy convenience even if no external mouse is connected.

The currently available touch panels are namely resistant touch panels, capacitive touch panels, optical touch panels, sonic wave touch panels, and electromagnetic touch panels. An optical touch display apparatus normally includes a display, an infrared light source, a light guiding unit, a sensor, and a processor. Here, the display includes a backlight module and a display panel. The infrared light source is disposed next to the display area to emit an infrared beam, and the infrared beam may be detected by the sensor after passing through the light guiding unit. When a touch object comes in contact with the display panel, the processor determines a location of the touch point by the intensity of the infrared beam detected by the sensor. However, since the infrared light source and the light guiding unit guiding the infrared beam are located next to the display area and are both isolated from the backlight module, the entire thickness of the touch display apparatus, the number of optical elements, and the costs are increased, and the assembly time may lengthen as well.

SUMMARY OF INVENTION

The invention is directed to an optical touch display apparatus with low cost and reduced thickness.

Numerous features and advantages of the invention may be better understood by referring to the disclosure herein.

In order to achieve one or a part of or all of the object or other objects, an embodiment of the invention provides an optical touch display apparatus including a backlight module, a display panel, and at least an optical detector. The backlight module is capable of providing a visible beam and an invisible beam. The display panel is disposed at one side of the backlight module. A sensing space is located in front of the display panel, and the display panel is located between the backlight module and the sensing space. The visible beam and the invisible beam are capable of passing through the display panel and then being transmitted to the sensing space. The optical detector is disposed outside the display panel. When a touch object enters the sensing space, a part of the invisible beam is reflected by the touch object, and the optical detector is disposed in a transmission path of the part of the invisible beam reflected by the touch object, so as to detect the part of the invisible beam. The part of the invisible beam transmitted to the optical detector forms a bright region in a frame detected by the optical detector, and the optical touch display apparatus is capable of determining a location of the touch object in the sensing space based on a location of the bright region in the frame.

In summary, the embodiment or embodiments of the invention may have at least one of the following advantages. In the optical touch display apparatus according to the embodiment of the invention, the backlight module may simultaneously emit the visible beam and the invisible beam. Therefore, it is not necessary to install other invisible light sources or light guiding units on the display panel and beside the sensing space. As such, the entire thickness of the optical touch display apparatus, the number of optical elements, the costs, and the assembly time may be reduced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
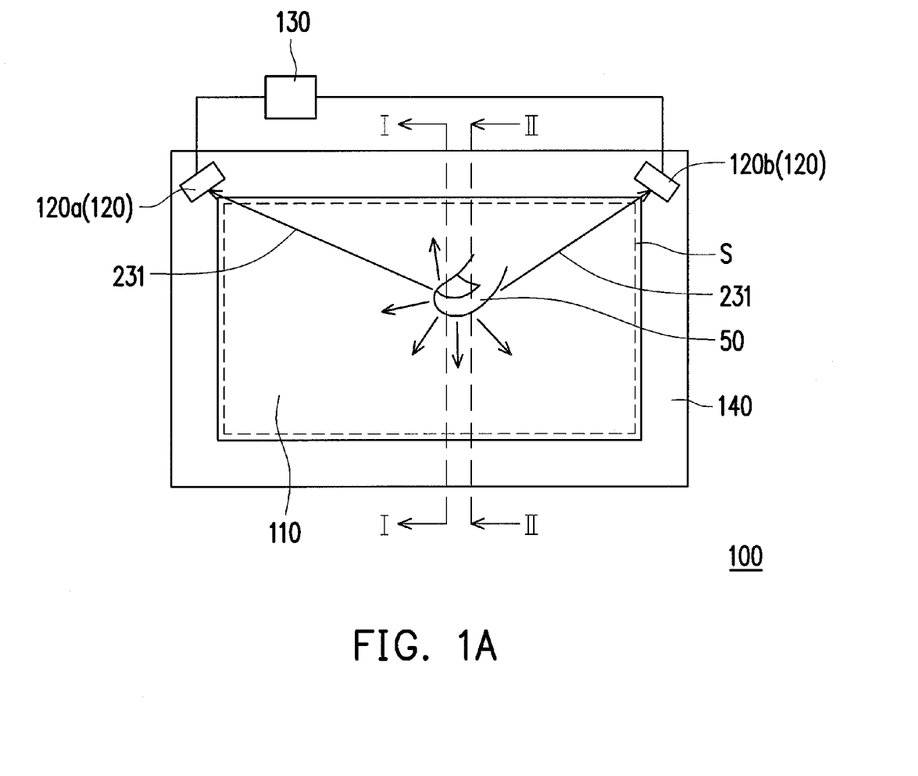
FIG. 1A is a schematic front view illustrating an optical touch display apparatus according to an embodiment of the invention.
Figure 1B:
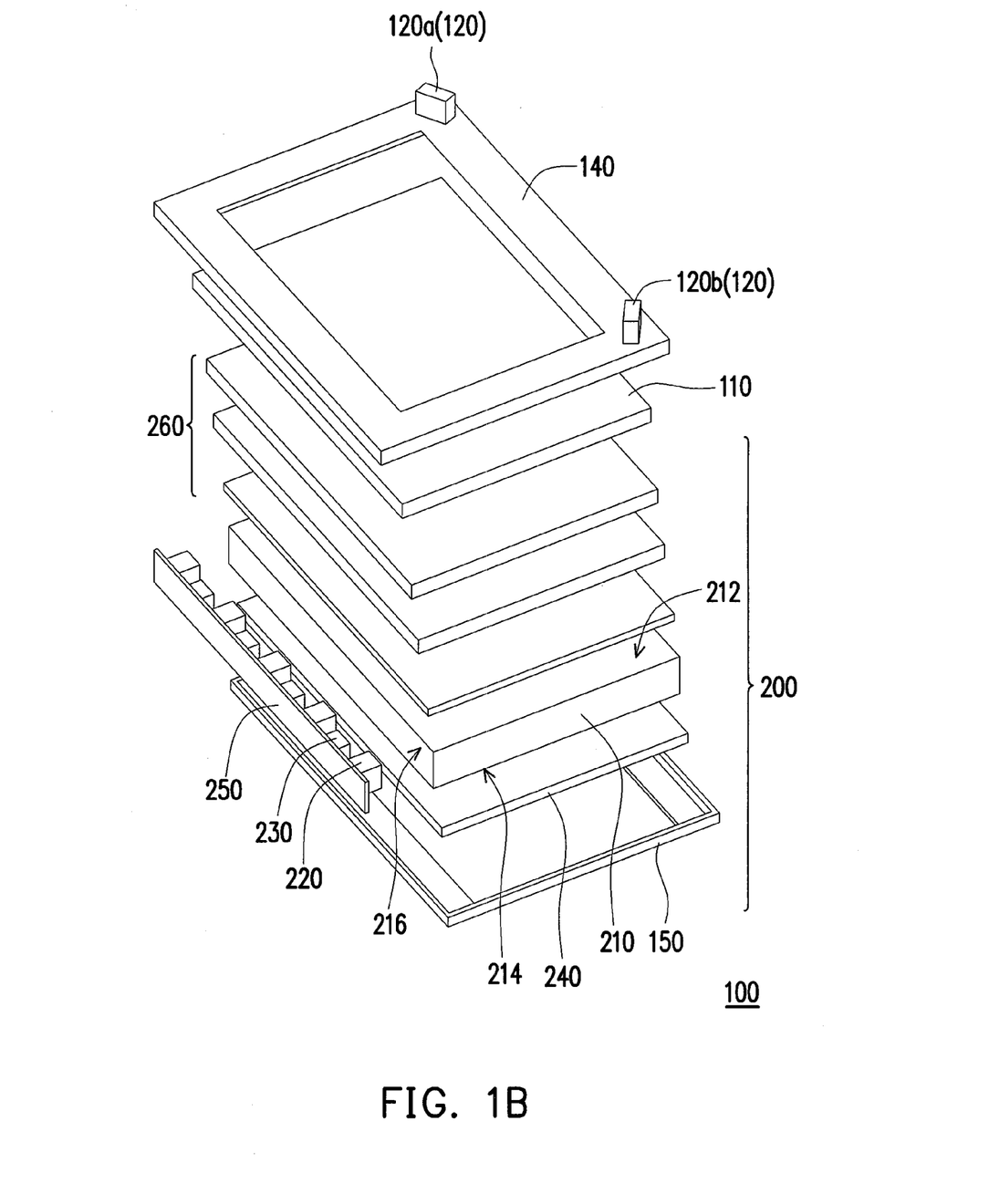
FIG. 1B is an exploded view illustrating the optical touch display apparatus depicted in FIG. 1A.

Referring to FIG. 1A to FIG. 1D, an optical touch display apparatus 100 of the embodiment includes a backlight module 200, a display panel 110, and at least an optical detector 120 (two optical detectors 120a and 120b are exemplarily shown in FIG. 1A and FIG. 1B). The backlight module 200 is capable of providing a visible beam 221 (shown in FIG. 1D) and an invisible beam 231 (shown in FIG. 1C). In this embodiment, the backlight module 200 includes a light guide plate 210, at least a visible light emitting element 220 (a plurality of visible light emitting elements 220 are exemplarily shown in FIG. 1B), and at least an invisible light emitting element 230 (a plurality of invisible light emitting elements 230 are exemplarily shown in FIG. 1B). Specifically, the visible light emitting elements 220 are light emitting diodes (LEDs), for example. The invisible light emitting elements 230 are infrared LEDs, for example, and the invisible beam 231 is, for instance, an infrared beam.

Figure 1C:
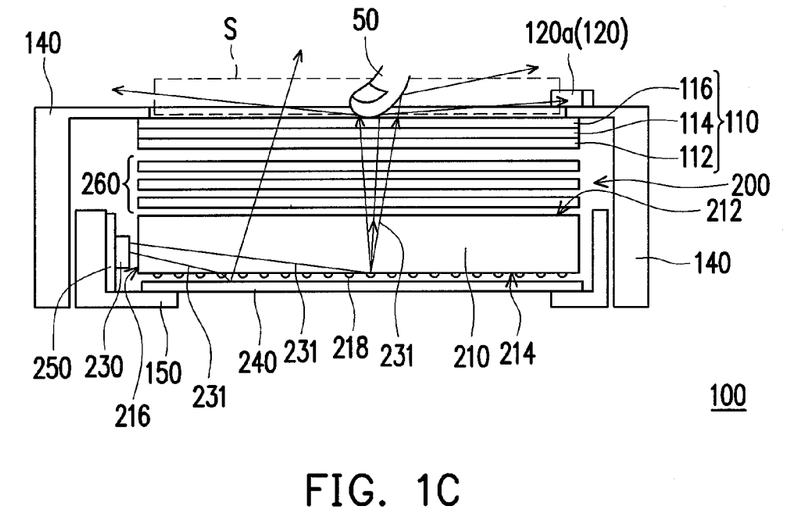
FIG. 1C is a schematic cross-sectional view illustrating the optical touch display apparatus depicted in FIG. 1A along a line segment I-I.
Figure 1D:
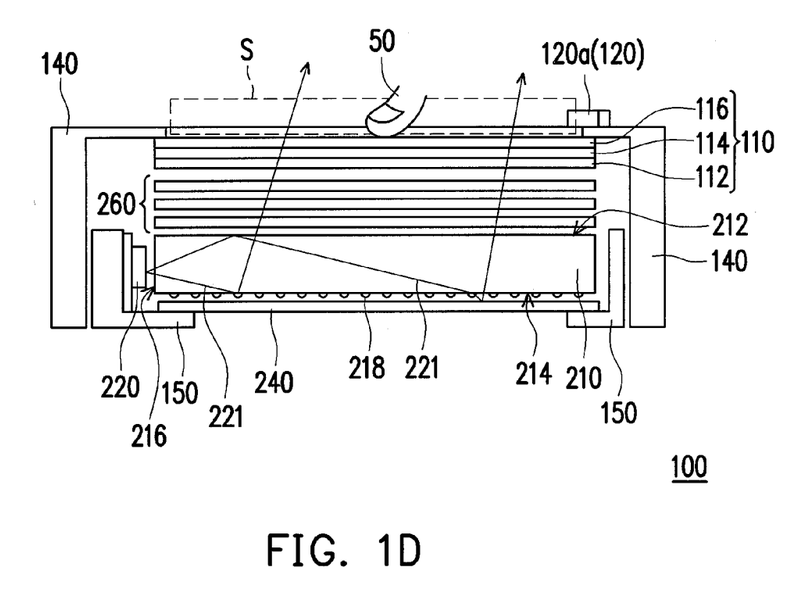
FIG. 1D is a schematic cross-sectional view illustrating the optical touch display apparatus depicted in FIG. 1A along a line segment II-II.

The light guide plate 210 has a first surface 212 facing the display panel 110, a second surface 214 facing away from the display panel 110, and a light incident surface 216 connecting the first surface 212 and the second surface 214. The visible light emitting elements 220 are capable of emitting the visible beam 221. The visible beam 221 is capable of entering the light guide plate 210 through the light incident surface 216 and being transmitted to the display panel 110 through the first surface 212. The invisible light emitting elements 230 are capable of emitting the invisible beam 231. The invisible beam 231 is capable of entering the light guide plate 210 through the light incident surface 216 and being transmitted to the display panel 110 through the first surface 212. In this embodiment, the backlight module 220 further includes a reflection unit 240 disposed at a side of the second surface 214, so as to reflect the visible beam 221 and the invisible beam 231 from the second surface 214 back to the light guide plate 210. Here, the reflection unit 240 is, for example, a reflection sheet.

In particular, when the visible beam 221 and the invisible beam 231 enter the light guide plate 210 through the light incident surface 216, the visible beam 221 and the invisible beam 231 are constantly and totally internally reflected by the first surface 212 and the second surface 214, such that the visible beam 221 and the invisible beam 231 are restrained within the light guide plate 210. However, scattering microstructures 218 on a surface of the light guide plate 210, e.g. the second surface 214 in this embodiment, break the total internal reflection, and a part of the visible beam 221 and a part of the invisible beam 231 are scattered to the first surface 212 and transmitted out of the light guide plate 210 through the first surface 212. Besides, another part of the visible beam 221 and another part of the invisible beam 231 are scattered by the scattering microstructures 218 to the reflection unit 240. The reflection unit 240 reflects the visible beam 221 and the invisible beam 231, such that the visible beam 221 and the invisible beam 231 sequentially pass through the second surface 214 and the first surface 212 to form a visible surface light source and an invisible surface light source on the first surface 212. It should be noted that the scattering microstructures 218 may also be formed on the first surface 212 or on both the first surface 212 and the second surfaces 214 in other embodiments.

In this embodiment, the visible light emitting elements 220 and the invisible light emitting elements 230 are alternately arranged beside the light incident surface 216. Besides, in this embodiment, the backlight module 200 further includes a carrier 250 on which the visible light emitting elements 220 and the invisible light emitting elements 230 are alternately disposed. The carrier 250 is, for example, a circuit board electrically connected to the visible light emitting elements 220 and the invisible light emitting elements 230.

The display panel 110 is disposed at a side of the backlight module 200. A sensing space S is located in front of the display panel 110, and the display panel 110 is located between the backlight module 200 and the sensing space S. The visible beam 221 and the invisible beam 231 (e.g. the visible beam 221 and the invisible beam 231 from the first surface 212) are capable of passing through the display panel 110 and being transmitted to the sensing space S. In this embodiment, the display panel 110 is, for example, a liquid crystal display panel and includes an active device array substrate 112, a liquid crystal layer 114, and an opposite substrate 116. The liquid crystal layer 114 is disposed between the active device array substrate 112 and the opposite substrate 116, and the active device array substrate 112 is disposed between the liquid crystal layer 114 and the backlight module 200. In this embodiment, the active device array substrate 112 is, for example, a thin film transistor (TFT) array substrate, and the opposite substrate 116 is, for example, a color filter array substrate.

The optical detector 120 is disposed outside the display panel 110 for sensing the invisible beam 231 from the sensing space S. In this embodiment, the optical detector 120 is disposed beside the sensing space S and at a side of the display panel 110 facing away from the backlight module 200. The optical detector 120 is, for example, a complementary metal oxide semiconductor (CMOS) sensor, a charge coupled device (CCD), a photo multiplier tube (PMT), or any other image detector. In this embodiment, a range detected by the optical detector 120 extends to the sensing space S right above the entire display area of the display panel 110. When a touch object 50 (e.g. a user's finger, the tip of a stylus, or any other appropriate object) enters the sensing space S, the invisible beam 231 irradiating the touch object 50 is scattered. Thus, the touch object 50 reflects a part of the invisible beam 231 to the optical detector 120. That is to say, the optical detector 120 is disposed in a transmission path of the part of the invisible beam 231 reflected by the touch object 50, so as to form a bright region in a frame detected by the optical detector 120. Here, the bright region is, for example, a bright spot. On the other hand, in parts of the sensing space S remaining unoccupied by the touch object 50, the invisible beam 231 is not reflected by any object to the optical detector 120, and thus a dark region (i.e. a dark background) is formed in the frame detected by the optical detector 120. The optical touch display apparatus 100 is capable of determining a location of the touch object 50 in the sensing space S based on a location of the bright region in the frame. To be more specific, the optical touch display apparatus 100 may further include a processing unit 130 electrically connected to the optical detector 120. In this embodiment, the processing unit 130 is electrically connected to the optical detectors 120a and 120b simultaneously. The processing unit 130 is capable of determining the location of the touch object 50 in the sensing space S based on the location of the bright region in the frame.

The backlight module 200 in this embodiment further includes an optical film set 260 disposed between the light guide plate 210 and the display panel 110. The optical film set 260 includes at least one of a brightness enhancement film (BEF), a prism sheet, and a diffusion sheet, i.e. the optical film set 260 includes a BEF, a prism sheet, a diffusion sheet, or any combination thereof.

In this embodiment, the optical touch display apparatus 100 further includes a front frame 140 covering an edge of the display panel 110. The optical detector 120 is disposed on the front frame 140, and a part of the front frame 140 is located between the optical detector 120 and the edge of the display panel 110. In addition, the optical detectors 120a and 120b in this embodiment are respectively disposed at two adjacent corners of the front frame 140. Moreover, the optical touch display apparatus 100 in this embodiment further includes a back frame 150 for accommodating the carrier 250 and the reflection unit 240.

In the optical touch display apparatus 100 of this embodiment, the backlight module 200 may simultaneously emit the visible beam 221 and the invisible beam 231. Therefore, it is not necessary to install other invisible light sources or light guiding units on the display panel 110 and beside the sensing space S. As such, the entire thickness of the optical touch display apparatus 100, the number of optical elements, the costs, and the assembly time may be reduced.

Figure 2A:
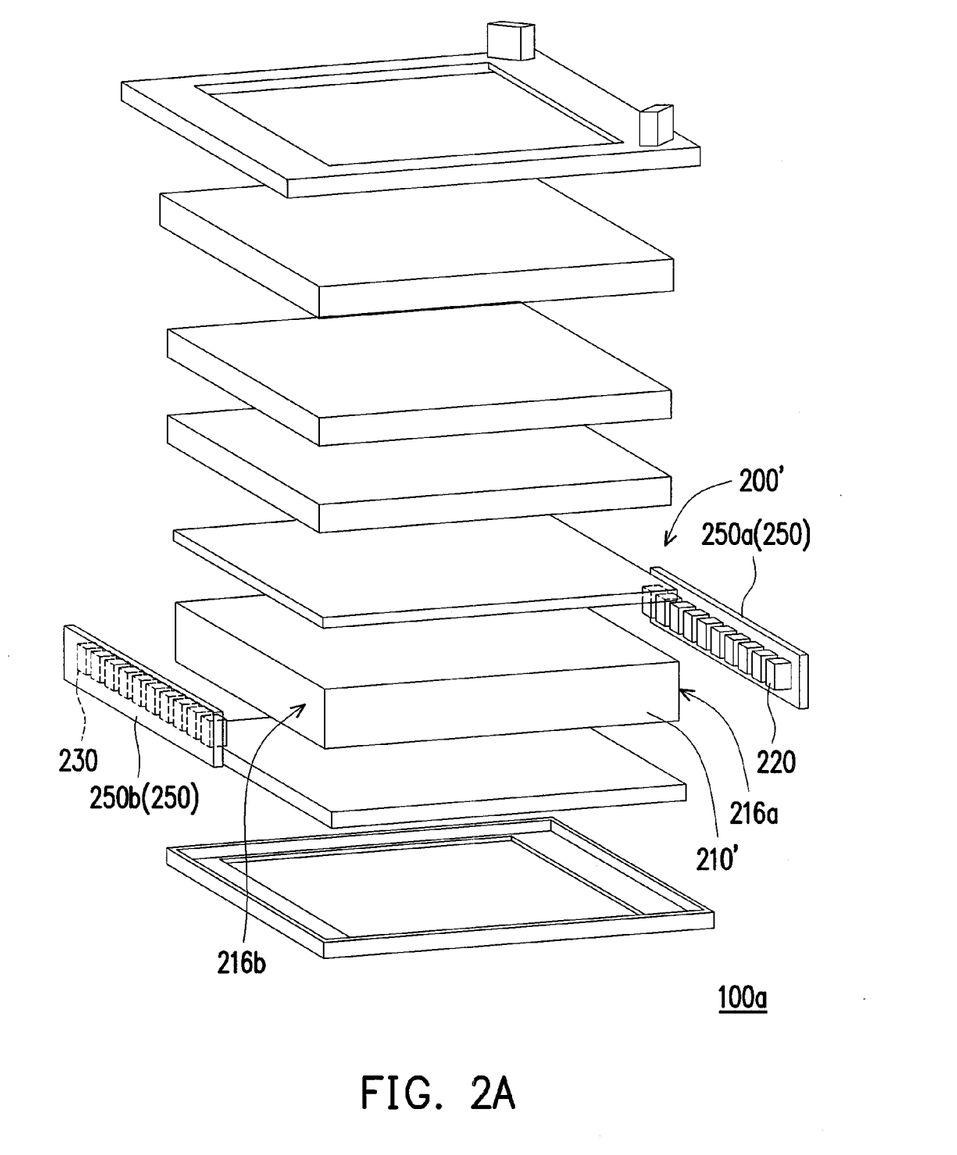
FIG. 2A is an exploded view illustrating an optical touch display apparatus according to another embodiment of the invention.
Figure 2B:
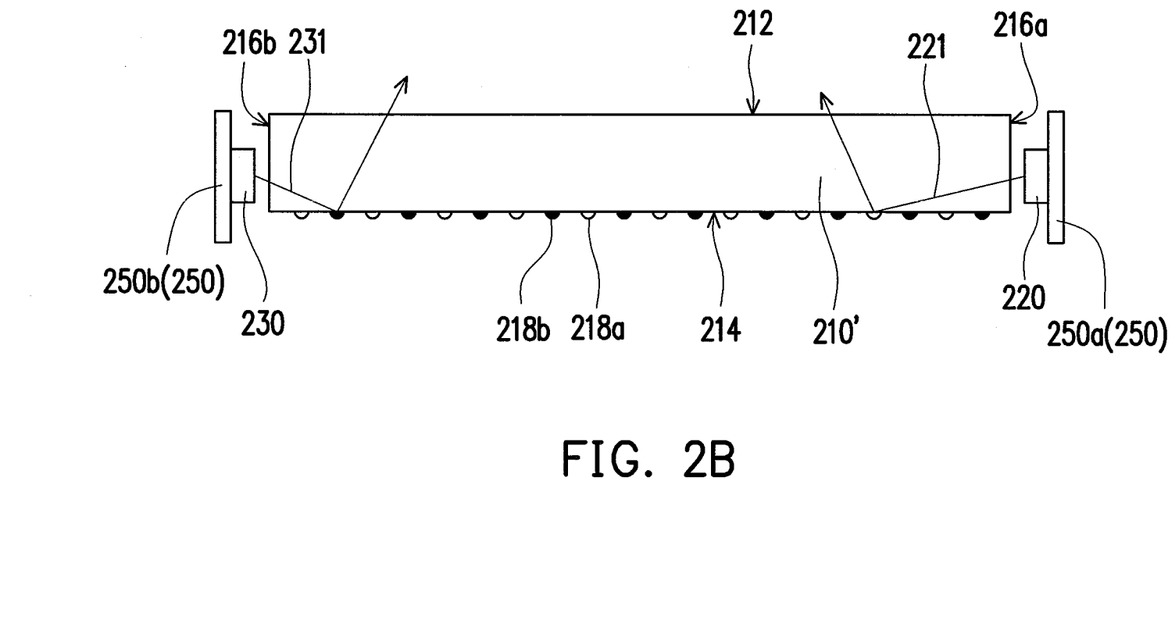
FIG. 2B is a schematic cross-sectional view illustrating one of the visible light emitting elements, one of the invisible light emitting elements, carriers, and the light guide plate depicted in FIG. 2A.

In FIG. 2A and FIG. 2B, a touch display apparatus 100a of this embodiment is similar to the touch display apparatus 100 depicted in FIG. 1B, while the difference between the touch display apparatus 100a and the touch display apparatus 100 is described hereinafter. In the touch display apparatus 100a, a light guide plate 210' has two light incident surfaces 216a and 216b respectively located at two opposite sides of the light guide plate 210'. The visible beam 221 emitted by the visible light emitting elements 220 and the invisible beam 231 emitted by the invisible light emitting elements 230 are capable of entering the light guide plate 210' respectively through the two light incident surfaces 216a and 216b. In particular, the backlight module 200' may include two carriers 250, i.e. a carrier 250a and a carrier 250b. The carrier 250a is disposed beside the light incident surface 216a, and the visible light emitting elements 220 are disposed on the carrier 250a. The carrier 250b is disposed beside the light incident surface 216b, and the invisible light emitting elements 230 are disposed on the carrier 250b. In this embodiment, the visible light emitting elements 220 and the invisible light emitting elements 230 are respectively disposed on different carriers 250a and 250b. Therefore, a distance between two adjacent visible light emitting elements 220 may be reduced, and the number of the visible light emitting elements 220 may be increased. Further, the brightness uniformity of the visible surface light source provided by the backlight module 200' may be improved. Likewise, a distance between two adjacent invisible light emitting elements 230 may be reduced as well, and the number of the invisible light emitting elements 230 may also be increased. Further, the brightness uniformity of the invisible surface light source provided by the backlight module 200' may be improved.

Besides, a plurality of scattering microstructures 218a and a plurality of scattering microstructures 218b may be formed on the first surface 212, on the second surface 214, or on both the first surface 212 and the second surfaces 214 of the light guide plate 210' (e.g. In FIG. 2B, the scattering microstructures 218a and 218b are formed on the second surface 214). A material of the scattering microstructures 218a is particularly suitable for scattering the visible beam 221, while a material of the scattering microstructures 218b is particularly suitable for scattering the invisible beam 231. Thereby, different distributions of the scattering microstructures 218a and 218b contribute to improvement of brightness uniformity of the visible surface light source and the invisible surface light source provided by the backlight module 200'. Nevertheless, in other embodiments, the scattering microstructures 218 capable of simultaneously scattering the visible beam 221 and the invisible beam 231 as shown in FIG. 1C may be used in the light guide plate in replacement of the scattering microstructures 218a and 218b. As long as the scattering microstructures 218 are appropriately distributed, the visible surface light source and the invisible surface light source provided by the backlight module 200' may also have favorable brightness uniformity.

Figure 3:
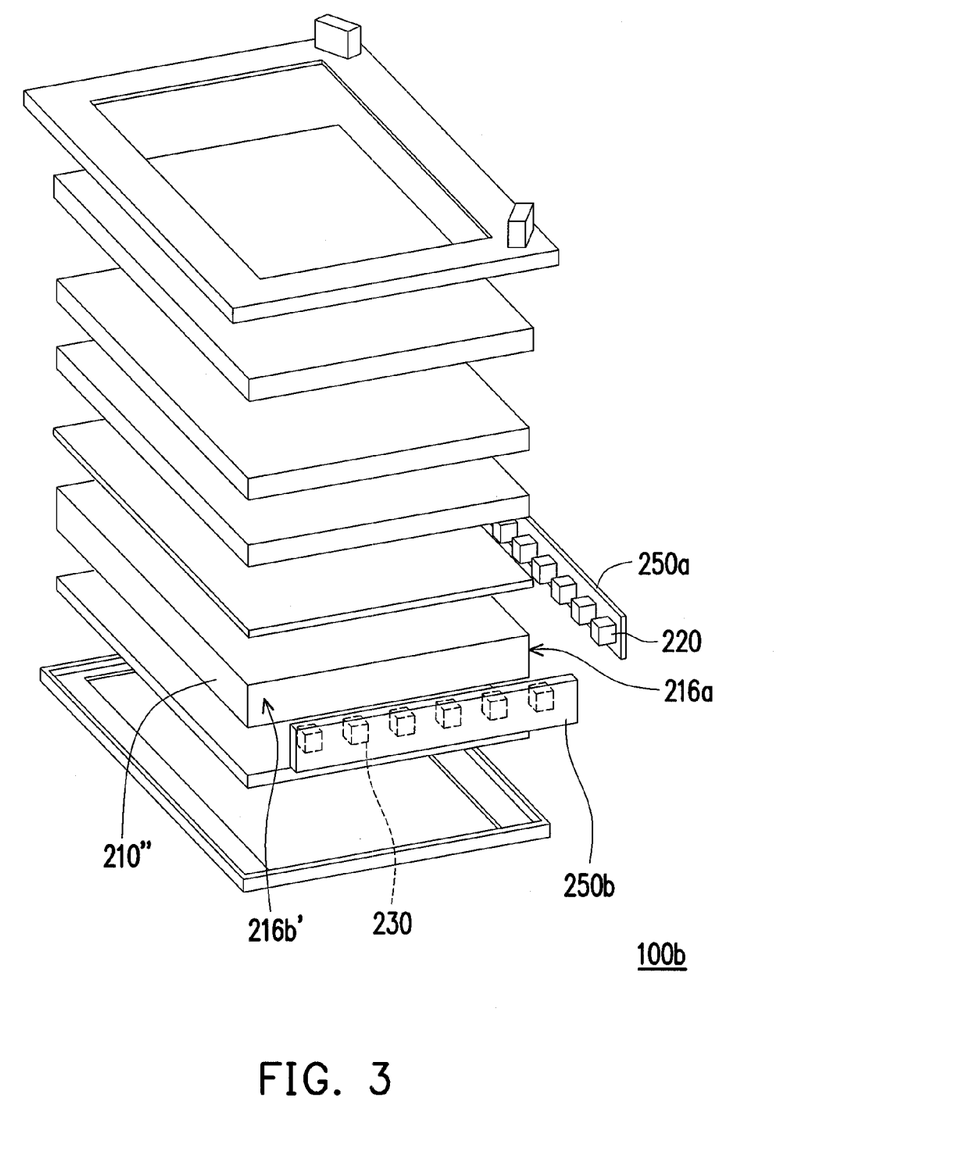
FIG. 3 is an exploded view illustrating an optical touch display apparatus according to still another embodiment of the invention.

In FIG. 3, an optical touch display apparatus 100b of this embodiment is similar to the optical touch display apparatus 100a depicted in FIG. 2A, while the difference between the optical touch display apparatus 100b and the optical touch display apparatus 100a is described hereinafter. In this embodiment, a light guide plate 210'' has two light incident surfaces 216a and 216b' respectively located at two adjacent sides of the light guide plate 210''. The visible light emitting elements 220 and the carrier 250a are disposed beside the light incident surface 216a, and the invisible light emitting elements 230 and the carrier 250b are disposed beside the light incident surface 216b'. It should be noted that the number of the light incident surfaces of the light guide plate is not limited to two or less according to this embodiment. In other embodiments, the light guide plate may have three or more light incident surfaces, and the visible light emitting elements 220 or the invisible light emitting elements 230 are disposed next to each of the light incident surfaces.

Figure 4A:
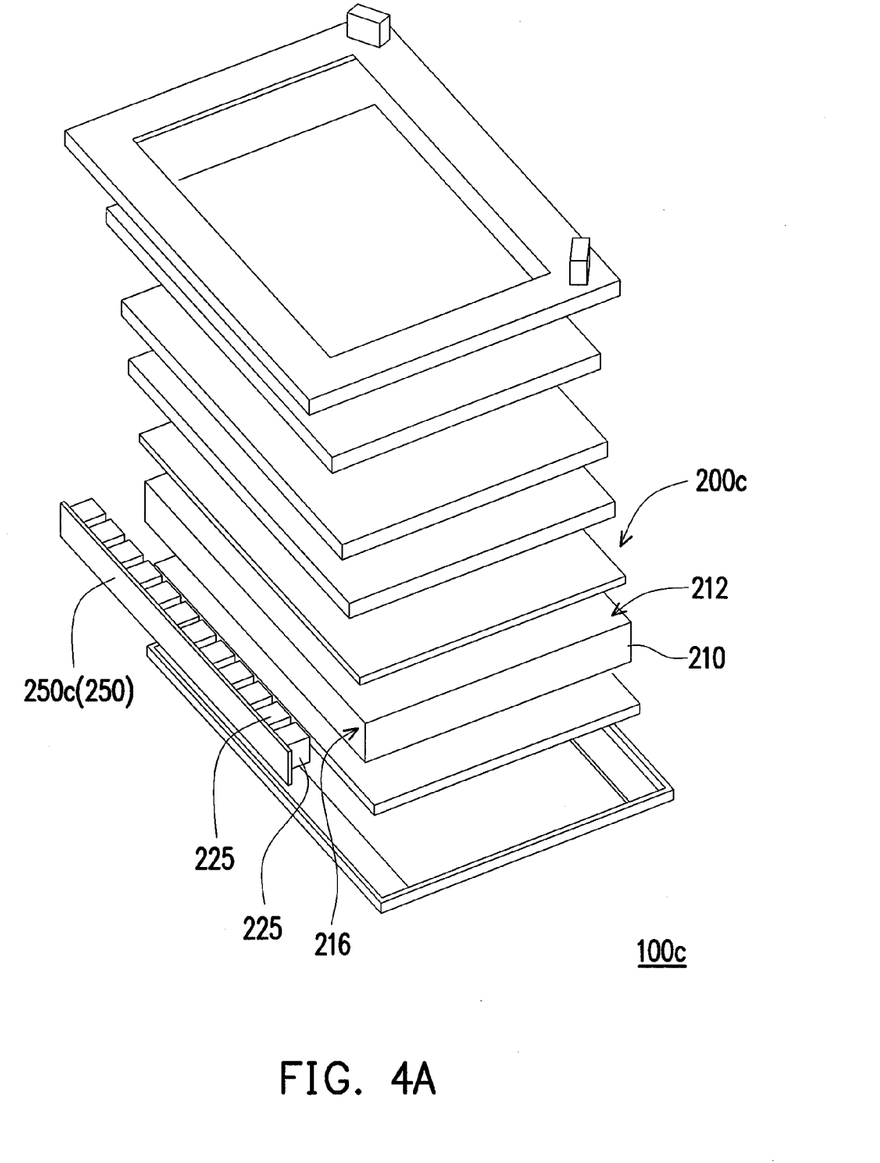
FIG. 4A is an exploded view illustrating an optical touch display apparatus according to yet another embodiment of the invention.
Figure 4B:
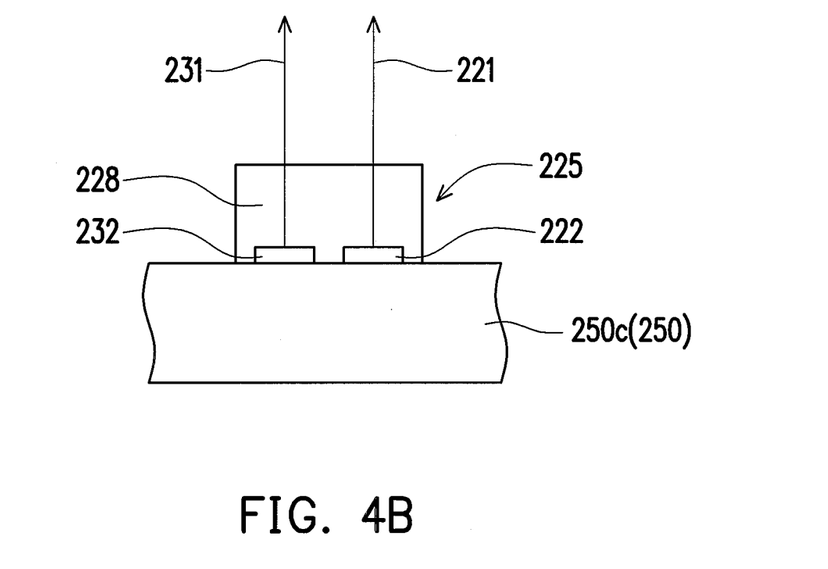
FIG. 4B illustrates one of the light emitting elements depicted in FIG. 4A.

In FIG. 4A and FIG. 4B, an optical touch display apparatus 100c of this embodiment is similar to the optical touch display apparatus 100 depicted in FIG. 1B, while the difference between the optical touch display apparatus 100c and the optical touch display apparatus 100 is described hereinafter. The visible light emitting elements 220 and the invisible light emitting elements 230 depicted in FIG. 1B are replaced by light emitting devices 225 in this embodiment. The light emitting devices 225 are capable of emitting both the visible beam 221 and the invisible beam 231. Thereby, a distance between two adjacent light emitting elements 225 may be decreased, and the brightness uniformity of the visible surface light source and the invisible surface light source provided by the backlight module 200c may be improved.

Particularly, each of the light emitting elements 225 includes a visible LED chip 222, an invisible LED chip 232, and an encapsulant 228. The visible LED chip 222 is capable of emitting the visible beam 221. The invisible LED chip 232 (e.g. an infrared LED chip) is capable of emitting the invisible beam 231 (e.g. an infrared beam). The encapsulant 228 encapsulates the visible LED chip 222 and the invisible LED chip 232. In other words, the visible LED chip 222 and the invisible LED chip 232 are located in the same LED package.

Figure 5:
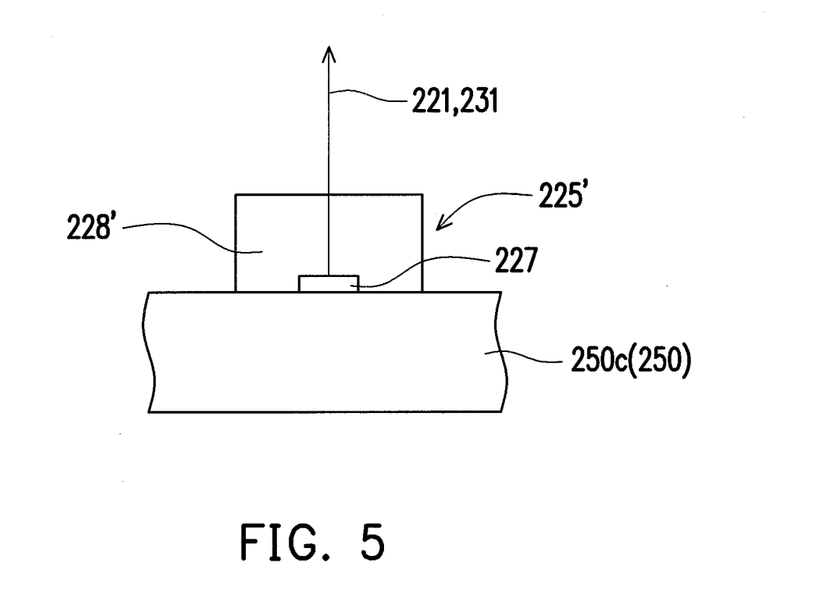
FIG. 5 illustrates a light emitting element according to another embodiment of the invention.

In FIG. 5, an optical touch display apparatus of this embodiment is similar to the optical touch display apparatus 100c depicted in FIG. 4A and FIG. 4B, while the difference therebetween is described hereinafter. The light emitting elements 225 depicted in FIG. 4A and FIG. 4B are replaced by light emitting elements 225' in this embodiment. Specifically, in FIG. 5, an LED chip 227 of the light emitting element 225' is capable of emitting both the visible beam 221 and the invisible beam 231. For example, a spectrogram illustrating the light beam emitted by the LED chip 227 reveals characteristics of the visible beam and the invisible beam. In addition, an encapsulant 228' encapsulates the LED chip 227.

It should be noted that the light emitting elements are not limited to be the LEDs in this invention. In other embodiments, the light emitting elements may also be fluorescent tubes, incandescent bulbs, halogen bulbs, or other proper light emitting elements.

Figure 6:
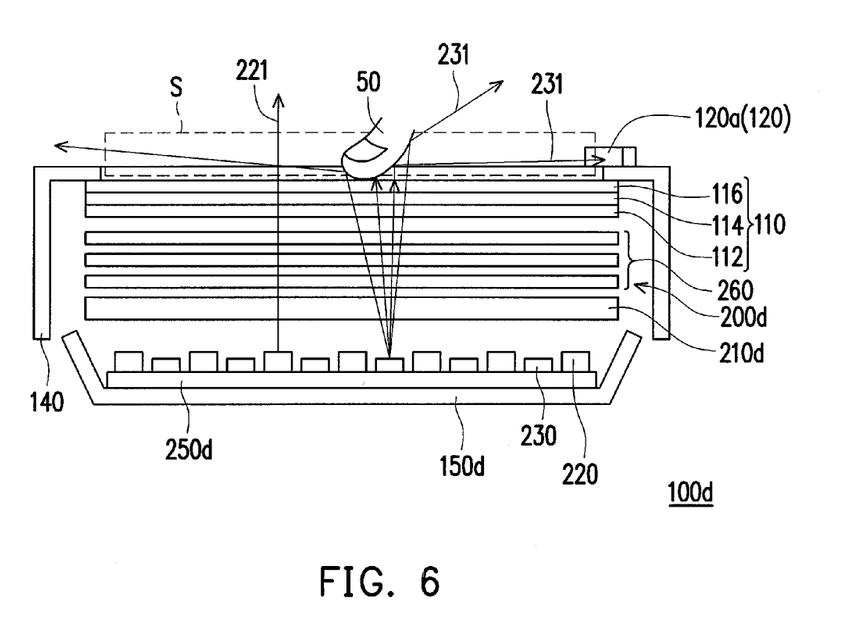
FIG. 6 is a schematic cross-sectional view illustrating an optical touch display apparatus according to still another embodiment of the invention.

In FIG. 6, an optical touch display apparatus 100d of this embodiment is similar to the optical touch display apparatus 100 depicted in FIG. 1B, while the difference between the optical touch display apparatus 100d and the optical touch display apparatus 100 is described hereinafter. The light guide plate 210 illustrated in FIG. 1B is replaced by a diffusion plate 210d of the optical touch display apparatus 100d in this embodiment. The diffusion plate 210d is disposed between each of the visible light emitting elements 220 and the display panel 110 and between each of the invisible light emitting elements 230 and the display panel 110. The visible beam 221 and the invisible beam 231 are capable of passing through the diffusion plate 210d and being transmitted to the display panel 110. In other words, the backlight module 200d of the optical touch display apparatus 100d is a direct type backlight module, while the backlight module 200 depicted in FIG. 1B is a side incident type backlight module. In this embodiment, the visible beam 221 and the invisible beam 231 are arranged on a carrier 250d in a two-dimensional array manner, and a back frame 150d accommodates the carrier 250d, the visible light emitting elements 220, and the invisible light emitting elements 230. The optical touch display apparatus 100d of this embodiment may achieve similar advantages and effects as accomplished by the optical touch display apparatus 100 depicted in FIG. 1B, and therefore no further description in this regard is provided herein.

The light emitting elements 225 in FIG. 4B or the light emitting elements 225' in FIG. 5 may replace the visible light emitting elements 220 and the invisible light emitting elements 230 in FIG. 6 in other embodiments, so as to form different types of optical touch display apparatuses.

Figure 7:
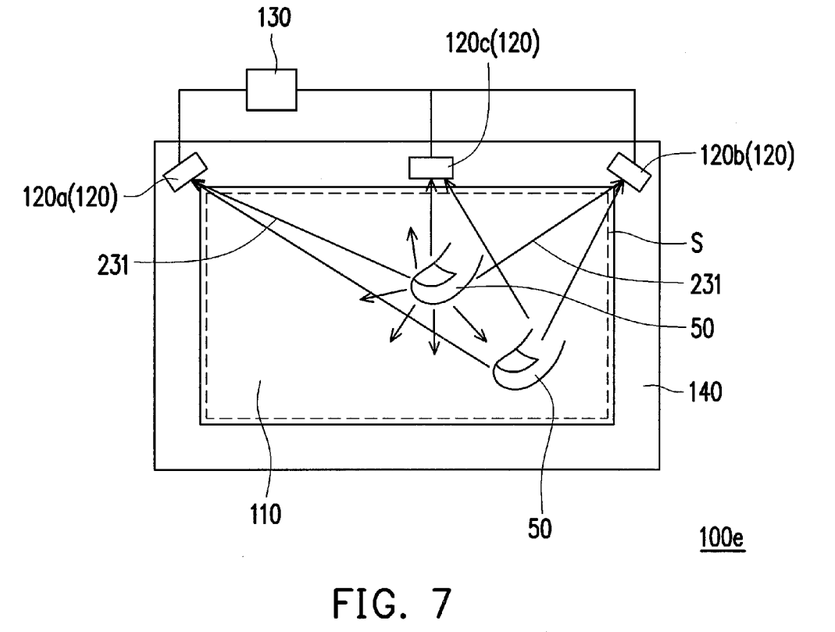
FIG. 7 is a schematic front view illustrating an optical touch display apparatus according to yet another embodiment of the invention.

In FIG. 7, an optical touch display apparatus 100e of this embodiment is similar to the optical touch display apparatus 100 depicted in FIG. 1A, while the difference between the optical touch display apparatus 100e and the optical touch display apparatus 100 is described hereinafter. The optical touch display apparatus 100e of this embodiment has three optical detectors 120, i.e. optical detectors 120a, 120b, and 120c. In this embodiment, the optical detector 120c is disposed at one side of the front frame 140, while the optical detector 120c may be disposed at any other corner or any other side of the front frame 140 in other embodiments. Since the optical touch display apparatus 100e has three optical detectors 120, the processing unit 130 may accurately determine individual locations of two touch objects 50 entering the sensing space S at the same time. As such, precise multi-touch may be accomplished when the optical touch display apparatus 100e is applied.

It should be noted that the number of the optical detectors 120 in the optical touch display apparatus 100e is not limited in this invention. The more the number of the optical detectors 120 is, the more touch points accurately determined by the multi-touch function may be achieved by the optical touch display apparatus. On the other hand, when there is only one optical detector 120, costs of the optical touch display apparatus may be effectively lowered down. In an embodiment, one optical detector 120 is sufficient to detect location variations of the touch object 50 in a one-dimensional manner, and the embodiment may be applied to an optical touch display apparatus requiring a simple touch function, e.g. a screen on an automatic teller machine (ATM).

Figure 8:
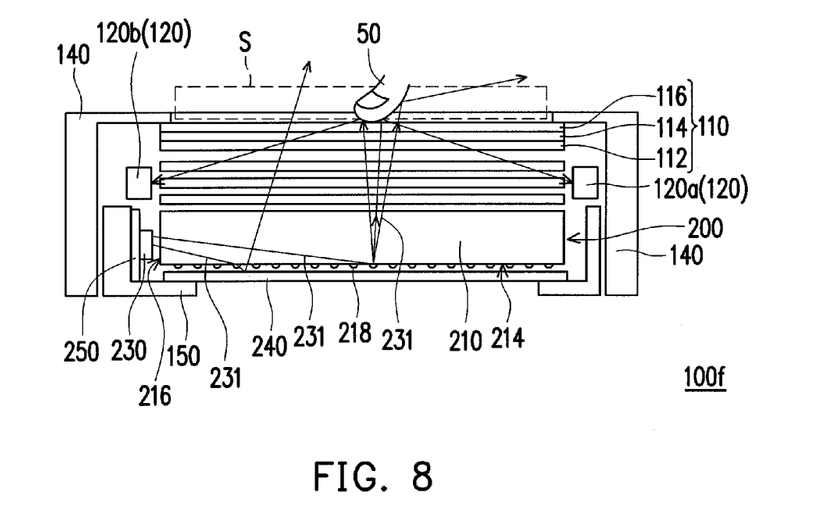
FIG. 8 is a schematic cross-sectional view illustrating an optical touch display apparatus according to another embodiment of the invention.

In FIG. 8, an optical touch display apparatus 100f of this embodiment is similar to the optical touch display apparatus 100 depicted in FIG. 1C, while the difference between the optical touch display apparatus 100f and the optical touch display apparatus 100 rests in locations of the optical detectors 120. In the optical touch display apparatus 100f of this embodiment, the optical detectors 120 (e.g. the optical detectors 120a and 120b) are disposed at a side of the display panel 110 facing the backlight module 200. In this embodiment, the optical detectors 120a and 120b are disposed next to the top of the backlight module 200. A part of the invisible beam 231 reflected by the touch object 50 passes through the display panel 110 and is then transmitted to the optical detectors 120a and 120b. The optical detectors 120 of this embodiment are located within the optical touch display apparatus 100f rather than on the front frame 140, so as to embellish the look of the optical touch display apparatus 100f. What is more, the thickness of the optical touch display apparatus 100f may be reduced.

In summary, the embodiment or embodiments of the invention may have at least one of the following advantages. In the embodiments of the invention, the backlight module in the optical touch display apparatus may simultaneously emit the visible beam and the invisible beam. Therefore, it is not necessary to install other invisible light sources or light guiding units on the display panel and beside the sensing space. As such, the entire thickness of the optical touch display apparatus, the number of optical elements, the costs, and the assembly time may be reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An optical touch display apparatus comprising:
   a backlight module capable of providing a visible beam and an invisible beam;
   a display panel disposed at a side of the backlight module, wherein a sensing space is located in front of the display panel, the display panel is located between the backlight module and the sensing space, and the visible beam and the invisible beam are capable of passing through the display panel and being transmitted to the sensing space;
   at least one optical detector disposed outside the display panel, wherein a part of the invisible beam is reflected by the touch object when a touch object enters the sensing space, and the at least one optical detector being disposed in a transmission path of the part of the invisible beam reflected by the touch object to detect the part of the invisible beam, and wherein the part of the invisible beam transmitted to the at least one optical detector forms a bright region in a frame detected by the at least one optical detector, and the optical touch display apparatus is capable of determining a location of the touch object in the sensing space based on a location of the bright region in the frame,
   wherein the backlight module comprises at least one light emitting element and a light guide plate having a first surface facing the display panel, a second surface facing away from the display panel and the at least one light emitting element, and at least one light incident surface connecting the first surface and the second surface; and
   a front frame, covering an edge of the display panel, wherein the at least one optical detector is disposed near the display panel and covered by the front frame,
   wherein the at least one light emitting element is capable of emitting the visible beam and the invisible beam, wherein the visible beam and the invisible beam are capable of entering the light guide plate through the at least one light incident surface and being transmitted to the display panel through the first surface, and the at least one light emitting element comprises:
   a visible light emitting diode chip capable of emitting the visible beam;
   an invisible light emitting diode chip capable of emitting the invisible beam; and
   an encapsulant encapsulating the visible light emitting diode chip and the invisible light emitting diode chip.

2. The optical touch display apparatus as claimed in claim 1, further comprising a processing unit electrically connected to the at least one optical detector, wherein the processing unit is capable of determining the location of the touch object in the sensing space based on the location of the bright region in the frame.

3. The optical touch display apparatus as claimed in claim 1, wherein the at least one optical detector is disposed beside the sensing space and located at a side of the display panel that is facing away from the backlight module.

4. The optical touch display apparatus as claimed in claim 3, wherein the at least one light emitting element of the backlight module comprises:
   at least one visible light emitting element capable of emitting the visible beam, wherein the visible beam is capable of entering the light guide plate through the at least one light incident surface and being transmitted to the display panel through the first surface; and
   at least one invisible light emitting element capable of emitting the invisible beam, wherein the invisible beam is capable of entering the light guide plate through the at least one light incident surface and being transmitted to the display panel through the first surface.

5. The optical touch display apparatus as claimed in claim 4, wherein the number of the at least one visible light emitting element is plural, the number of the at least one invisible light emitting element is plural, and the visible light emitting elements and the invisible light emitting elements are alternately arranged beside the at least one light incident surface.

6. The optical touch display apparatus as claimed in claim 4, wherein the number of the at least one light incident surface is two, the two light incident surfaces are respectively located at two opposite sides of the light guide plate, and the visible beam emitted from the at least one visible light emitting element and the invisible beam emitted from the at least one invisible light emitting element are capable of entering the light guide plate respectively through the two light incident surfaces.

7. The optical touch display apparatus as claimed in claim 4, wherein the number of the at least one light incident surface is two, the two light incident surfaces are respectively located at two adjacent sides of the light guide plate, and the visible beam emitted from the at least one visible light emitting element and the invisible beam emitted from the at least one invisible light emitting element are capable of entering the light guide plate respectively through the two light incident surfaces.

8. The optical touch display apparatus as claimed in claim 3, wherein the at least one light emitting element capable of emitting the visible beam and the invisible beam, wherein the visible beam and the invisible beam are capable of entering the light guide plate through the at least one light incident surface and being transmitted to the display panel through the first surface.

9. The optical touch display apparatus as claimed in claim 1, wherein the at least one optical detector is disposed at a side of the display panel that is facing the backlight module, and the part of the invisible beam reflected by the touch object passes through the display panel and is transmitted to the at least one optical detector.

10. The optical touch display apparatus as claimed in claim 1, wherein the at least one light emitting element of the backlight module comprises:
    at least one visible light emitting element capable of emitting the visible beam, wherein he visible beam is capable of entering the light guide plate through the at least one light incident surface and being transmitted to the display panel through the first surface; and
    at least one invisible light emitting element capable of emitting the invisible beam, wherein the invisible beam is capable of entering the light guide plate through the at least one light incident surface and being transmitted to the display panel through the first surface.

11. The optical touch display apparatus as claimed in claim 10, wherein the number of the at least one visible light emitting element is plural, the number of the at least one invisible light emitting element is plural, and the visible light emitting elements and the invisible light emitting elements are alternately arranged beside the at least one light incident surface.

12. The optical touch display apparatus as claimed in claim 10, wherein the number of the at least one light incident surface are two, the two light incident surfaces are respectively located at two opposite sides of the light guide plate, and the visible beam emitted from the at least one visible light emitting element and the invisible beam emitted from the at least one invisible light emitting element are capable of entering the light guide plate respectively through the two light incident surfaces.

13. The optical touch display apparatus as claimed in claim 12, wherein the backlight module further comprises:
    a first carrier disposed beside one of the two light incident surfaces, wherein the number of the at least one visible light emitting element is plural, and the visible light emitting elements are disposed on the first carrier; and
    a second carrier disposed beside the other one of the two light incident surfaces, wherein the number of the at least one invisible light emitting element is plural, and the invisible light emitting elements are disposed on the second carrier.

14. The optical touch display apparatus as claimed in claim 10, wherein the number of the at least one light incident surface is two, the two light incident surfaces are respectively located at two adjacent sides of the light guide plate, and the visible beam emitted from the at least one visible light emitting element and the invisible beam emitted from the at least one invisible light emitting element are capable of entering the light guide plate respectively through the two light incident surfaces.

15. The optical touch display apparatus as claimed in claim 14, wherein the backlight module further comprises:
    a first carrier disposed besides one of the two light incident surfaces, wherein the number of the at least one visible light emitting element is plural, and the visible light emitting elements are disposed on the first carrier; and
    a second carrier disposed besides the other one of the two light incident surfaces, wherein the number of the at least one invisible light emitting element is plural, and the invisible light emitting elements are disposed on the second carrier.

16. The optical touch display apparatus as claimed in claim 10, wherein the backlight module further comprises a reflection unit disposed at a side of the second surface to reflect the visible beam and the invisible beam from the second surface back to the light guide plate.

17. The optical touch display apparatus as claimed in claim 10, wherein the at least one visible light emitting element is a visible light emitting diode, and the at least one invisible light emitting element is an infrared light emitting diode.

18. The optical touch display apparatus as claimed in claim 1, wherein the at least one light emitting element comprises:
    a light emitting diode chip capable of emitting the visible beam and the invisible beam; and
    an encapsulant encapsulating the light emitting diode chip.

19. The optical touch display apparatus as claimed in claim 1, wherein the backlight module further comprises a reflection unit disposed beside the second surface to reflect the visible beam and the invisible beam from the second surface back to the light guide plate.

20. The optical touch display apparatus as claimed in claim 1, wherein the at least one light emitting element of the backlight module comprises:
    a plurality of visible light emitting elements capable of emitting the visible beam;
    a plurality of invisible light emitting elements capable of emitting the invisible beam; and
    a diffusion plate disposed between each of the visible light emitting elements and the display panel and disposed between each of the invisible light emitting elements and the display panel, wherein the visible beam and the invisible beam are capable of passing through the diffusion plate and being transmitted to the display panel.

21. The optical touch display apparatus as claimed in claim 1, wherein the at least one light emitting element of the backlight module comprises:
    a plurality of light emitting elements capable of emitting the visible beam and the invisible beam; and
    a diffusion plate disposed between each of the light emitting elements and the display panel, wherein the visible beam and the invisible beam are capable of passing through the diffusion plate and being transmitted to the display panel.

22. An optical touch display apparatus comprising:
a backlight module capable of providing a visible beam and an invisible beam, the backlight module comprising:
    at least one light emitting element and a light guide plate having a first surface facing the display panel, a second surface facing away from the display panel and the at least one light emitting element, and two light incident surfaces connecting the first surface and the second surface, the at least one light emitting element comprising:
        at least one visible light emitting element capable of emitting the visible beam, wherein the visible beam is capable of entering the light guide plate through one of the two light incident surfaces and being transmitted to the display panel through the first surface; and at least one invisible light emitting element capable of emitting the invisible beam, wherein the invisible beam is capable of entering the light guide plate through the other of the two light incident surfaces and being transmitted to the display panel through the first surface, wherein the two light incident surfaces are respectively located at two adjacent sides of the light guide plate, and the at least one visible light emitting element and the at least one invisible light emitting element are capable of entering the light guide plate respectively through the two light incident surfaces;

a first carrier disposed beside one of the two light incident surfaces, wherein the number of the at least one visible light emitting element is plural, and the visible light emitting elements are disposed on the first carrier; and a second carrier disposed beside the other one of the two light incident surfaces, wherein the number of the at least one invisible light emitting element is plural, and the invisible light emitting elements are disposed on the second carrier;

a display panel disposed at a side of the backlight module, wherein a sensing space is located in front of the display panel, the display panel is located between the backlight module and the sensing space, and the visible beam and the invisible beam are capable of passing through the display panel and being transmitted to the sensing space;

at least one optical detector disposed outside the display panel, wherein a part of the invisible beam is reflected by the touch object when a touch object enters the sensing space, and the at least one optical detector being disposed in a transmission path of the part of the invisible beam reflected by the touch object to detect the part of the invisible beam, and wherein the part of the invisible beam transmitted to the at least one optical detector forms a bright region in a frame detected by the at least one optical detector, and the optical touch display apparatus is capable of determining a location of the touch object in the sensing space based on a location of the bright region in the frame; and a front frame, covering an edge of the display panel, wherein the at least one optical detector is disposed near the display panel and covered by the front frame.

\* \* \* \* \*